United States Patent [19]

Morishita

[11] Patent Number: 4,742,423

[45] Date of Patent: May 3, 1988

[54] GAS INSULATED APPARATUS

[75] Inventor: Masao Morishita, Kyoto, Japan

[73] Assignee: Nission Electric Company, Limited, Kyoto, Japan

[21] Appl. No.: 932,558

[22] Filed: Nov. 20, 1986

[30] Foreign Application Priority Data

Nov. 22, 1985 [JP]  Japan ................................ 60-262800

[51] Int. Cl.[4] .............................................. H02H 3/14
[52] U.S. Cl. ........................................ 361/47; 361/58;
                                                    200/144 R; 200/144 AP
[58] Field of Search ............................... 361/1, 6, 8–10,
            361/13, 14, 47, 42, 58, 89, 126, 161, 91, 102,
                107, 94, 62; 200/144 AP, 144 R, 148 R

[56] References Cited

U.S. PATENT DOCUMENTS 4,002,867  1/1977  Cherry ..................... 200/144 AP X
4,623,767  11/1986  Schulz .......................... 200/144 AP Primary Examiner—A. D. Pellinen
Assistant Examiner—Todd E. De Boer
Attorney, Agent, or Firm—Sughrue, Mion, Zinn, Macpeak, and Seas

[57] ABSTRACT

A gas insulated apparatus for high voltage, 3-phase applications in which an insulating, self-arc-extinguishing gas separates the high voltage lines from grounded vessels. According to the invention, the transverse impedance of the vessels is chosen so that a normal voltage impressed on the lines will produce a current through the resistive vessel that will be extinguished by the gas.

4 Claims, 2 Drawing Sheets

SF6 GAS: 0.4kg/cm² g
TEST VOLTAGE: 12.7 kV
GAP LENGTH: 39 mm

O: ARC COULD BE EXTINGUISHED.
X: ARC COULD NOT BE EXTINGUISHED.

MULTI-PHASE EARTH FAULT CURRENT (A)

GAS INSULATED APPARATUS

BACKGROUND OF THE INVENTION

1. Field of the Invention

The present invention relates to a gas insulated apparatus and particularly relates to a gas insulated apparatus in which a grounded closed vessel is filled with an insulating gas so that an electrically live part disposed in the vessel is insulated by the insulating gas.

2. Background of the Invention

Recently, a gas insulated switch-gear has been widely used in an electric power station in order to reduce the space for mounting electric power equipment and increase safety of the same. In this gas insulated switch gear, a circuit breaker, a disconnecting switch, a bus, etc., are disposed in a grounded metal vessel filled with an insulating gas such as an $SF_6$ gas so as to establish insulation to the ground as well as inter-phase insulation by the insulating gas.

FIG. 3 schematically shows the arrangement of such a gas insulated switch-gear as described above. The gas insulated switch-gear is constituted by conductors 21 which are hot or electrically live parts, disconnecting switches 22 and circuit breakers 23 both connected to the conductors 21. The conductors 21 passed through current transformers 24. Metal vessels 25 enclosing the fore going components. Insulating spacers 26 partition spaces in the metal vessels 25 and support the conductors 21. Bushings 27 fixed to end portions of the respective metal vessels 25 support the conductors 21. The metal vessels 25 are filled with $SF_6$ gas 28. In such a gas insulated switch-gear, an arc may be generated between each of the conductors 21 and the associated grounded metal vessel 25 when an abnormal voltage is applied to the conductor 21. However, the arc can be extinguished by the arc-extinction action of the $SF_6$ gas 28 when the voltage is returned to its normal state.

In the thus arranged gas insulated switch-gear, assuming that an abnormal voltage $V_S$ enters onto the conductors 21 from a transformer 29 to thereby generate a ground fault at one point, for example, at a point A as shown in the drawing, a ground fault current $I_{gs}$ substantially of a value as shown by the following expression (1) flows, $$I_{gs} = V_S/(Z_{fa} + Z_n + Z_t) \approx V_S/(Z_n + Z_t) \tag{1}$$

where $Z_{fa}$ represents an impedance at the fault point A; $Z_n$, an impedance at a neutral point of the transformer 29; and $Z_t$, an internal impedance of the transformer 29.

Thereafter, when the abnormal voltage $V_S$ is returned to a normal one $V_E$, the ground fault current $I_{ge}$ assumes a value as expressed by the following expression (2).

$$I_{ge} = V_E/Z_n \tag{2}$$

In this case, if the neutral point impedance $Z_n$ is suitably determined so that the ground fault current $I_{ge}$ is smaller than a self-arc-extinction current at which an arc is self extinguished owing to the $SF_6$ gas 28, the arc of the ground fault current $I_{ge}$ may be rapidly extinguished.

If a multi-phase ground fault is generated at three different phase points, for example, at the points A, B and C as shown in the drawing, however, no current flows through the neutral point impedance $Z_n$, so that the ground fault current $I_{ge}$ does not decrease below the self-arc-extinction current and the earth fault current $I_{ge}$ is left to flow as it is.

Alternatively, if a multi-phase ground fault is generated at two different phase points, for example, the points A and B, the ground fault current $I_{ge}$ in this case becomes a value as expressed by the following expression (3).

$$I_{ge} = \sqrt{3}\, V_E/(Z_{fa} + Z_{fb} + Z_t) \tag{3}$$

where $Z_{fb}$ represents an impedance at the fault point B.

The ground fault current $I_{ge}$ in this case is remarkably larger than that in the case where a ground fault is generated at one point, such as the point A, as described above, because the impedance $(Z_{fa}+Z_{fb}+Z_t)$ in expression (3) is much smaller than the neutral point impedance $Z_n$ and a voltage of $\sqrt{3}V_E$ is applied across the two faulted conductors 21. p If a ground fault is generated and a ground fault current $I_{ge}$ continues to flow, the danger occurs that the pressure in the metal vessel 25 is made so high owing to the arc as to thereby cause the vessel 25 to explode or the metal vessel 25 is partly melted to be broken by the fixed root of the arc. In a switch-gear, therefore, it is desired that even if a multi-phase earth fault occurs to generate an arc, the arc can be extinguished immediately as soon as the abnormal voltage $V_S$ is returned to the normal value $V_E$.

SUMMARY OF THE INVENTION

A object of the present invention is therefore to eliminate the disadvantages in the prior art.

Another object of the present invention is to provide a gas insulated switch-gear in which even if a multi-phase ground fault is generated by an abnormal voltage to cause an arc, the arc can be extinguished when the voltage is returned to a normal value.

In order to attain the above objects, the gas insulated apparatus according to the present invention comprises grounded closed vessels for respectively accommodating live parts separately from each other for every phase, and an insulating gas filling each of the closed vessel 5 for insulating the live part in the closed vessel. Each of the closed vessels has a resistance value between inner and outer surfaces of the closed vessel which is selected so that a value of a fault current flowing in the closed vessel upon generation of a multiphase ground fault is smaller than a value of a self-arc-extinction current due to the insulating gas.

In the thus arranged gas insulated apparatus, since the resistance value of the respective closed vessel is selected so that a value of a fault current flowing in the closed vessel upon generation of a multi-phase ground fault is smaller than that of a self-arc-extinction current of the insulating gas, even if an abnormal voltage is impressed on the live part to thereby cause a multiphase earth fault, an arc can be extinguished as soon as the voltage applied to the live part is returned to a normal value.

Other features and advantages of the invention will be apparent from the following description taken in connection with the accompanying drawings.

DETAILED DESCRIPTION OF THE PREFERRED EMBODIMENT

Figure 1:
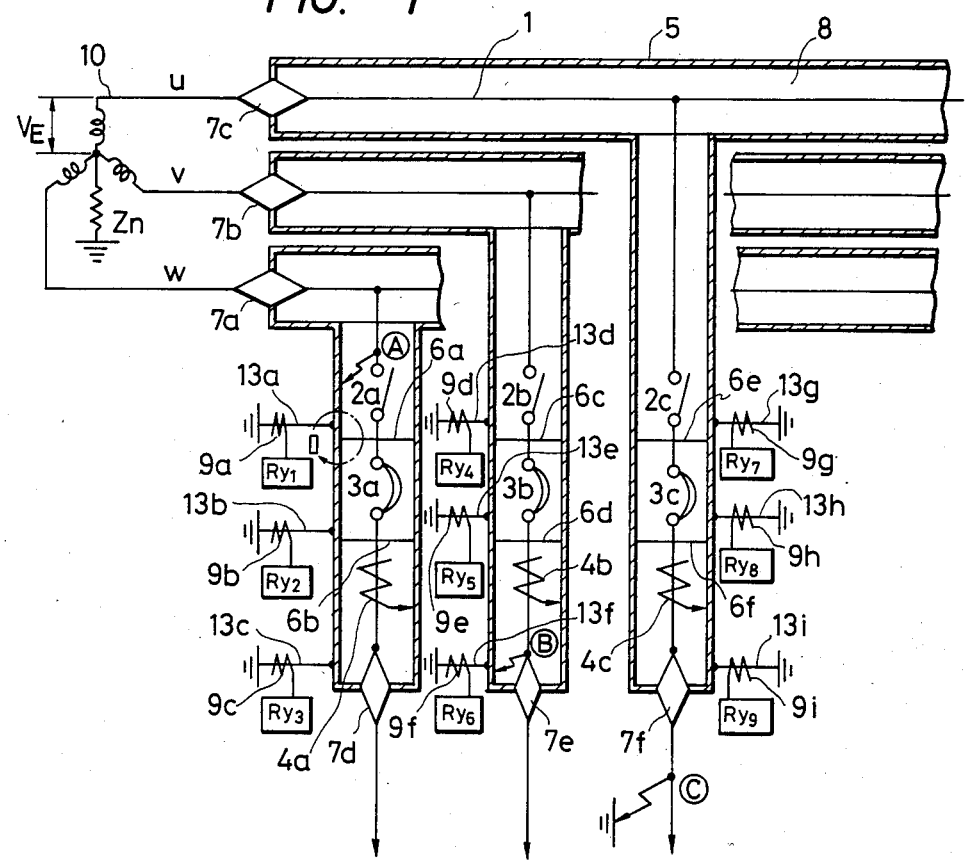
FIG. 1 is a cross section schematically showing the arrangement of an embodiment of the gas insulated apparatus according to the present invention.
Figure 2:
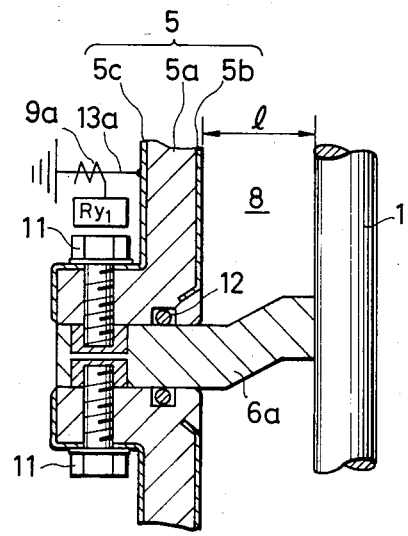
FIG. 2 is a cross section showing the arrangement of the section II of FIG. 1 in detail.

Description will be made as to the arrangment of an embodiment of the gas insulated apparatus according to the present invention with reference to FIGS. 1 and 2. FIG. 1 is a cross section schematically showing the arrangment of the embodiment, and FIG. 2 is an enlarged cross section showing a part II of FIG. 1 in detail. In this embodiment, the gas insulated apparatus is constituted by live parts 1, disconnecting switches 2a-2c, circuit breakers 3a-3c, current transformers 4a-4c, closed vessels 5, insulating spacers 6a-6f, bushings 7a-7f, an insulating gas 8, current sensors 9a-9i, and ground fault detecting relays $R_{y1}$-$R_{y9}$.

The live parts 1 which carry three-phase alternating current from a transformer 10 are separated for the respective phases, and are respectively disposed in the three cylindrical closed vessels 5 each filled with the insulating gas 8. The live parts 1 are respectively supported by the insulating spacers 6a and 6b, 6c and 6d, and 6e and 6f fixed to connecting portions of the closed vessels 5 and also supported by the bushings 7a and 7b, 7c and 7d, and 7e and 7f fixed to the end portions of the closed vessels 5.

The insulating spacers 6a-6f support the live parts 1 as described above on one hand, and partition the respective spacers in the closed vessels 5 on the other hand. Each of these insulating spacers 6a-6f is shaped substantially like a disk, as shown in detail in FIG. 2, and each of spacers 6a-6f is fixed to the connecting portion of the closed vessel 5 by bolts 11. An O-ring 12 is disposed between each of opposite end surfaces of the connecting portion of the closed vessel 5 and the insulating spacer 6 so as to prevent the insulating gas 8 from leaking out of the closed vessel 5.

Figure 3:
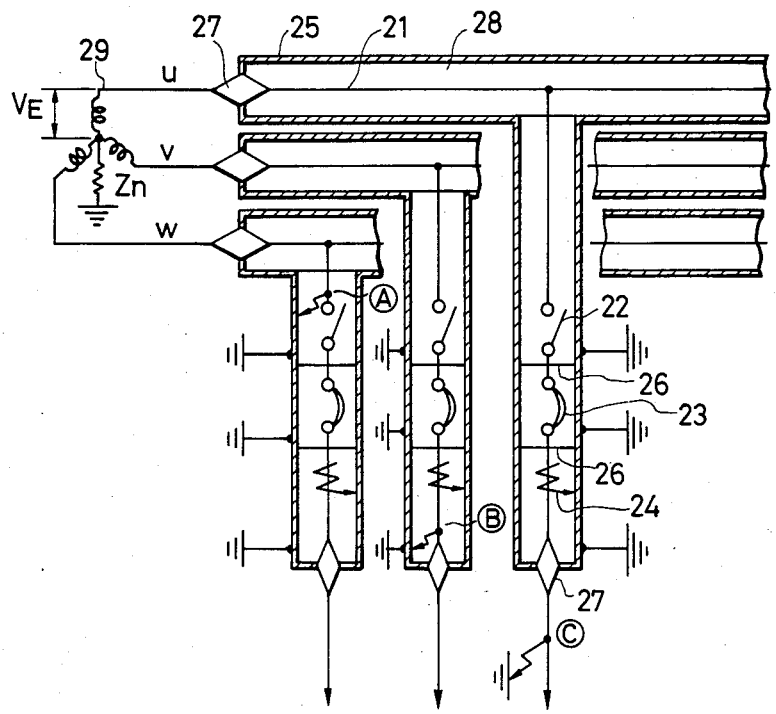
FIG. 3 is a cross section schematically showing the arrangement of an example of the conventional gas insulated apparatus.

Unlike the conventional closed vessel shown in FIG. 3, each of the closed vessels 5 is constituted by a resistive central portion 5a, and highly conductive surface portions 5b and 5c which cover the inner and outer surfaces of the resistive portion 5a respectively. The resistor portion 5a is made of, for example, epoxy resin into which conductive powder is added. The outer highly conductive portions 5c of the respective vessels 5 are respectively connected to ground conductors 13a-13c, 13d-13f, and 13g-13i which are respectively provided with the ground fault detecting relays $R_{y1}$-$R_{y3}$, $R_{y4}$-$R_{y6}$, and $R_{y7}$-$R_{y9}$ and the current sensors 9a-9c, 9d-9f and 9g-9i.

In this embodiment, the respective closed vessel 5 is constituted by the resistive portion 5a and the highly conductive portions 5b and 5c as described above, and the resistance value of the resistive portion 5a in the thickness direction is so determined that the fault current value $I_g$ flowing in the closed vessel 5 upon generation of a multi-phase ground fault is smaller than the self-arc-extinction current value $I_n$ of the insulating gas 8.

Assuming that a multi-phase earth fault is generated at a point in the vicinity of the disconnecting switch 2a, for example (the fault point A), and at another point in the vicinity of the bushing 7e, for example, the fault point B as shown in FIG. 1, it will suffice to select the resistance value of the resistor portion 5a so that the following expression (4) is established.

$$I_g < \sqrt{3}\ V_E/(Z_a + Z_b) < I_n \qquad (4)$$

where $Z_a$ and $Z_b$ represent impedances of the closed vessel 5 at the fault points A and B, and $V_E$ represents the output voltage of the transformer 10.

Assuming that a multi-phase ground fault is generated at a point outside the gas insulated apparatus, for example, the above-mentioned fault point C, it will suffice to select the resistance value of the resistive portion 5a so that the following expression (5) is established on the assumption that dead ground is generated at the fault point C.

$$I_g < \sqrt{3}\ V_E/Z_a < I_n \qquad (5)$$

Upon comparing the foregoing expressions (4) and (5), it is seen that the impedance which determined the fault current value $I_g$ are $(Z_a+Z_b)$ and $Z_a$ in the two expressions (4) and (5). Therefore, a lower limit of the resistance value of the resistor portion 5a is determined so that the expression (5) is satisfied.

In view of the expression (5), it is considered that the value of the impedance $Z_a$ may be set to be infinitely large. However, if the resistance value of the resistor portion 5a is selected to be larger, discharge hardly occurs between the live part 1 and the closed vessel 5 even when an abnormal voltage is applied to the live part 1, and if discharge is once generated, the discharging paths are concentrated at one point so that there is generated such danger that the insulator of the closed vessel 5 is melted to be broken by generated heat or the pressure in the closed vessels 5 is made higher to thereby explode the closed vessel 5. Therefore, an upper limit of the resistance value of the resistor portion 5a is set so as not to generate the foregoing event.

In order to set the upper and lower limits of the resistance value of the resistor portion 5a in such a manner as described above, it is necessary to know the foregoing self-arc-extinction current value $I_n$. The self-arc-extinction current value $I_n$ is determined depending on the kind of the insulating gas 8, the filling pressure P of the gas 8, the shortest distance between the surface of the live part 1 and the inner surface of the closed vessel 5, or the like.

Figure 4:
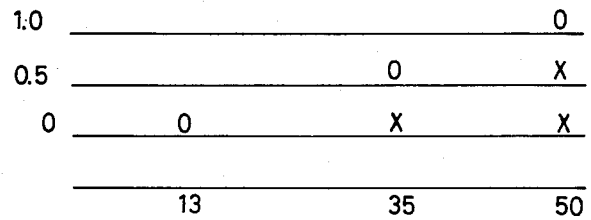
FIG. 4 is a graph of test results for the selfextinction of ground faults.

FIG. 4 is a graph showing shows the resultant data of a test in the case where a multi-phase ground fault was generated nearly in the resistance grounded state. Test conditions in the case of FIG. 4 were such that the test voltage was 12.7 kV, the test circuit power-factor was between 0 and 1, the SF$_6$ filling pressure was 0.4 kg/cm$^2$ g, and the foregoing shortest distance was 39 mm.

That is, when the power factor was 1, an arc could be extinguished at the multi-phase ground fault current up to 50 A, and the resistance $Z_a$ to be inserted in this case is as follows.

$$Z_a = 12.7 \text{ kV}/50 \text{ A} = 254 \text{ ohms}.$$

In this embodiment, on the basis of the foregoing trial, synthetic resin or synthetic rubber provided with a final conductivity of about $10^6$ ohm·cm–$10^7$ ohm·cm. may be used as a material for the resistor portion $5a$ constituting the closed vessel 5.

In this embodiment, there are provided the ground fault detecting relays $R_{y1}$-$R_{y9}$ which are operated in accordance with respective detection outputs of the current sensors $9a$-$9i$ for detecting respective currents passing through the ground conductors $13a$-$13i$. It is possible to count the number of occurrences of ground faults on the basis of the operations of those ground fault dectecting relays $R_{y1}$-$R_{y9}$.

In this embodiment, a ground fault is generated when an abnormal voltage enters the live part, and an arc is self extinguished as soon as the voltage is returned to a normal one. However, the quality of the gas in the closed vessel is remarkably degraded when the number of earth faults exceeds a certain value. Accordingly, the ground fault current, and the time and the number of fault occurance are detected on the basis of the operations of the earth detecting relays $R_{y1}$-$R_{y9}$ so that when the integrated value of the ground fault current reaches a predetermined value in any one of the closed vessels 5, the gas in the vessel 5 is exchanged or the vessel 5 per se is replaced by a new one in accordance with the degree of damage of the vessel.

Although the switch-gear has a structure which is provided with the live parts 1 separated from one another for every phase in the foregoing embodiment, the invention is, of course, applicable to a structure provided with only buses without having any disconnecting switches and circuit breakers. In the gas insulated apparatus according to the present invention, the resistance value of the respective closed vessel is selected so that the fault current flowing in the closed vessel upon generation of a different-phase earth fault is smaller than that of the self-arc-extinction current due to the insulating gas, so that there is such an effect that even if a multi-phase earth fault is generated, an arc can be extinguished as soon as a voltage applied to the live part is returned to a normal value.

What is claimed is:

1. A gas insulated apparatus comprising:
   grounded closed vessels accommodating live parts separately from each other for every phase;
   an insulating gas filled in each of said closed vessels for insulating said live part in said closed vessel;
   each of said closed vessels comprises a resistive portion having a resistance value and having highly conductive portions covering the inner and outer surfaces of said resistive portion; and
   said resistance value being selected so that a value of a fault current flowing in said closed vessel upon generation of a multi-phase earth fault is smaller than a value of a self-arc-extinction current $I_n$ due to said insulating gas.

2. A gas insulated apparatus according to claim 1, wherein a lower limit of said resistance value $Z_a$ is calculated from a ratio of a normal output voltage $V_E$ and said self-arc-extinction current $I_n$.

3. A gas insulated apparatus according to claim 2, wherein three said live parts carry three phases and $$Z_a > \sqrt{3} \; V_E/I_n.$$

4. A gas insulated apparatus recited in claim 1, wherein said resistive portion has a conductivity in the range of $10^6$ to $10^7$ ohm·cm.

* * * * *

UNITED STATES PATENT AND TRADEMARK OFFICE
CERTIFICATE OF CORRECTION

PATENT NO. : 4,742,423

DATED : May 3, 1988

INVENTOR(S) : Masao Morishita, Kyoto, Japan

It is certified that error appears in the above-identified patent and that said Letters Patent is hereby corrected as shown below:

On the Title Page, Item [73],
Under Assignee: Change "Nission Electric Company, Limited" to --Nissin Electric Company Limited--

Signed and Sealed this

Sixteenth Day of May, 1989

Attest:

DONALD J. QUIGG

Attesting Officer

Commissioner of Patents and Trademarks